United States Patent [19]

Szabo

[11] 4,072,843

[45] Feb. 7, 1978

[54] APPARATUS AND METHOD FOR WELD BONDING

[75] Inventor: Robert L. Szabo, San Diego, Calif.

[73] Assignee: General Dynamics Corporation, San Diego, Calif.

[21] Appl. No.: 696,603

[22] Filed: June 16, 1976

[51] Int. Cl.² .............................................. B23K 11/10
[52] U.S. Cl. .................................. 219/91.21; 219/91.1
[58] Field of Search ....................... 219/86, 89, 91, 92, 219/108, 110, 111, 117 R

[56] References Cited

U.S. PATENT DOCUMENTS

| 1,933,936 | 11/1933 | Schnetzer | 219/110 |
| 2,996,603 | 8/1961 | Stolz et al. | 219/89 |
| 3,497,660 | 2/1970 | Henry-Biabaud | 219/89 |
| 3,538,293 | 11/1970 | Procacino | 219/110 |
| 3,860,782 | 6/1975 | Hamby | 219/89 |

FOREIGN PATENT DOCUMENTS 2,137,784  2/1972  Germany ................. 219/91

Primary Examiner—J. V. Truhe
Assistant Examiner—Clifford C. Shaw
Attorney, Agent, or Firm—John R. Duncan

[57] ABSTRACT

Improved apparatus for weld bonding together a pair of conductors separated by a layer of thermo-plastic insulation material. The apparatus comprises a pair of welding electrodes for urging the pair of conductors together at a first level of electrode squeeze pressure while a first low level of current flows through the electrodes and conductors until the thermo-insulation material between the conductors beneath the electrodes is penetrated, electronic circuits for sensing this insulation penetration and initiating after a pre-selected time delay, a second higher level of welding current and electronic controls for increasing the electrode squeeze pressure from the first level to a second higher or forging level for at least a portion of the flow of the second higher welding level of current. A method for forming the weld bond is included.

7 Claims, 10 Drawing Figures

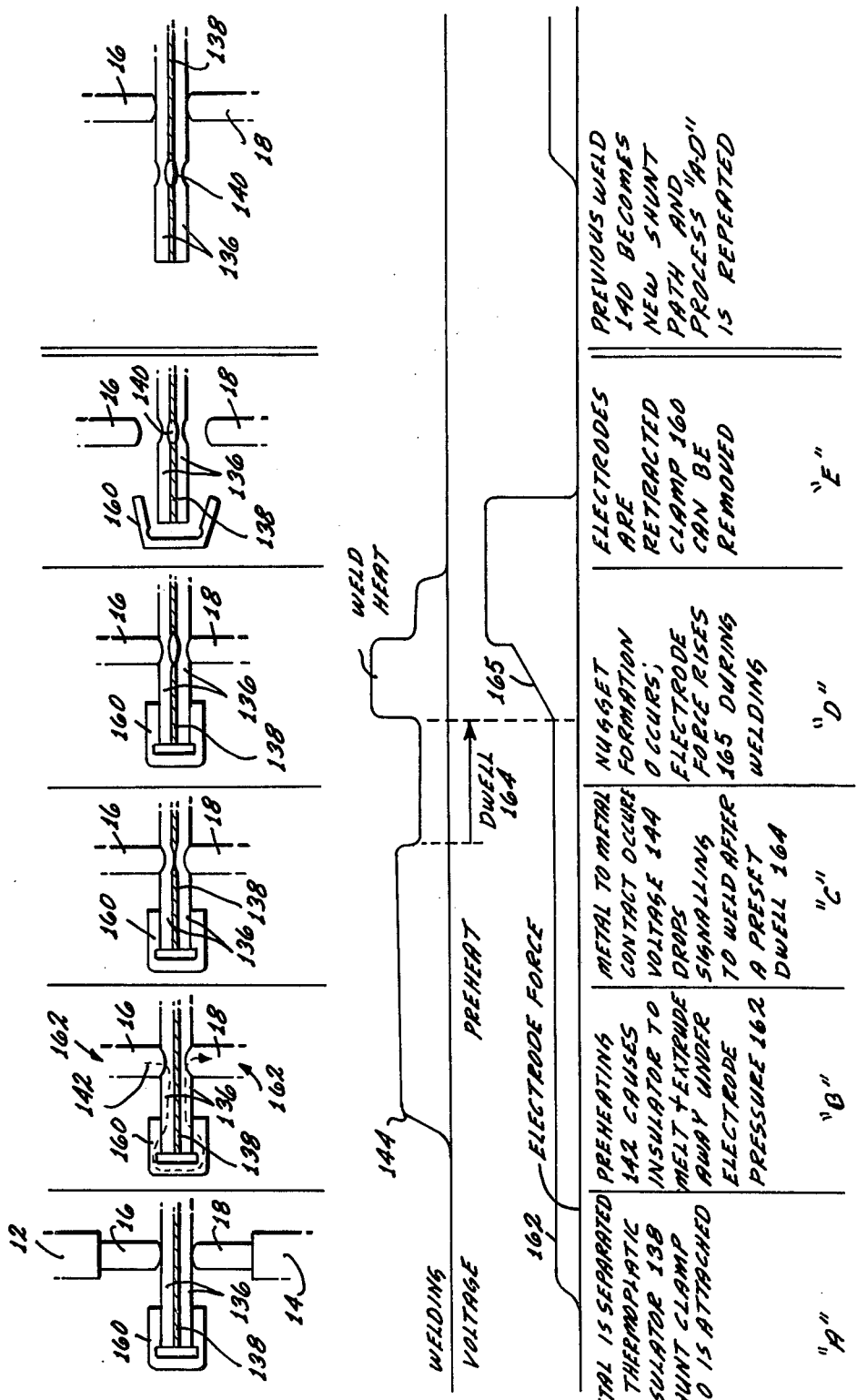

APPARATUS AND METHOD FOR WELD BONDING

BACKGROUND OF THE INVENTION

This invention generally relates to weld-bonding and more particularly to an improved weld-bonding of high surface resistance conductors separated by theremoplastic insulation materials.

There are various and well known state of the art apparatus and methods for the weld-bonding of various structures. Each of these have achieved a degree of success.

S. Schnetzer, in U.S. Pat. No. 1,933,936 teaches a method of weld-bonding where penetration of the insulation material is achieved by gradually increasing the force between the electrodes without the use of any heat. This type of force penetration is undesirable as deformation of the materials by force results in stretch of the materials and resulting fractures.

P. Procacino, in U.S. Pat. No. 3,538,293 teaches reliance upon the electrical engagement between the electrodes and the conductors themselves to test for penetration and to apply weld current. This is found to result in a poor weld because of a wide range of material heat variance at the point of welding resulting in range of inconsistant bonds due to various different thickness and types of material. Procacino additionally teaches that a heat only stage of a fixed duration should be used while maintaining a close control over electrode temperature by using an external thermocouple controlled heating means embedded in the electrodes. This method requires special and expensive electrodes and it has been found that a fixed duration of melt heat can either be excessive or insufficient for a proper level of material heating depending upon the character of the material to be bonded and the type of adhesive used.

U.S. Pat. Nos. 3,317,407, 3,337,711, 3,614,375, 3,798,403 and 3,643,057 teach various other methods for performing weld bonding that include penetrating the thermo-plastic insulation material in the same or similar manner as discussed above.

After the thermo-plastic insulation material has been penetrated, state of the art resistance welding apparatus controls elevated the voltage across the electrode tips. The elevated voltage applied through the low resistance material results in an elevated weld current flow. After this current has flowed for a pre-selected time, it is terminated and an increased squeeze or forge pressure is applied to the electrode tips. It has been found that poor welds occur using this sequence of operation in that the material has not necessarily reached optimum temperature immediately after penetration and that in some instances the increase in material heat when weld current is applied causes an expansion greater then the first level of squeeze pressure resulting in expulsion of the weld nugget from the point of weld.

It would obviously be advantageous to improve weld-bonding by insuring consistant perfect penetration and weld by a simple and inexpensive improvement to now existing state of the art resistance welding apparatus.

Until the emergence of the instant invention, this could not be readily achieved.

SUMMARY OF THE INVENTION

The instant invention advances the existing art of weld-bonding. The invention combines proven features of exising apparatus with improved means for thermoplastic insulation penetration and prevention of nugget expulsion. The improvement comprises the use of a reduced squeeze pressure during low level insulation penetration current flow, a time delay between penetration and application of elevated weld current and an increase of squeeze pressure during at least a portion of the flow of weld current.

The principal object of this invention is to insure conductivity between the materials, a uniform and correct level of material heat at the weld area prior to the application of weld current and the prevention of nugget expulsion during the weld current flow.

This and other advantages and characterizing features of the instant invention will become more apparent upon consideration thereof, taken in connection with the accompanying drawings depicting the same.

The same reference numerals are used throughout the figures and specification to denote the same element or part.

DESCRIPTION OF THE DRAWINGS

FIGS. 5A-E are a sectional sequential showing of the materials and the electrode squeeze pressure with respect to the weld current cycle.

DETAILED DESCRIPTION OF THE PREFERRED EMBODIMENT

This invention employs the well known method of heating the thermo-plastic adhesive by passing a low level of current through the electrodes through either a conductive clamp positioned adjacent the area to be joined by a resistance weld, when performing a first weld joint between the materials, or through a first or parent weld adjacent the next weld joint location for sequential welds.

Figure 1:
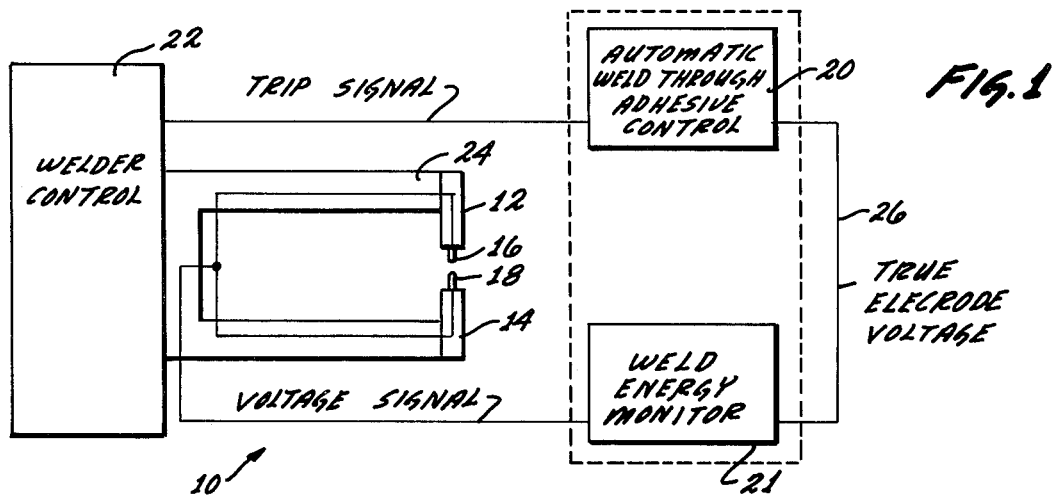
FIG. 1 is a block diagram showing of the various components comprising the welding apparatus of the invention.

Referring now specifically to FIG. 1, there is shown a block diagram 10 of the welding apparatus. The apparatus includes upper and lower electrode arms 12, 14, respectively. The welding tips 16 and 18 are controlled electrically by the automatic weld through adhesive controller 20 and the machine controls 22.

Figure 2:
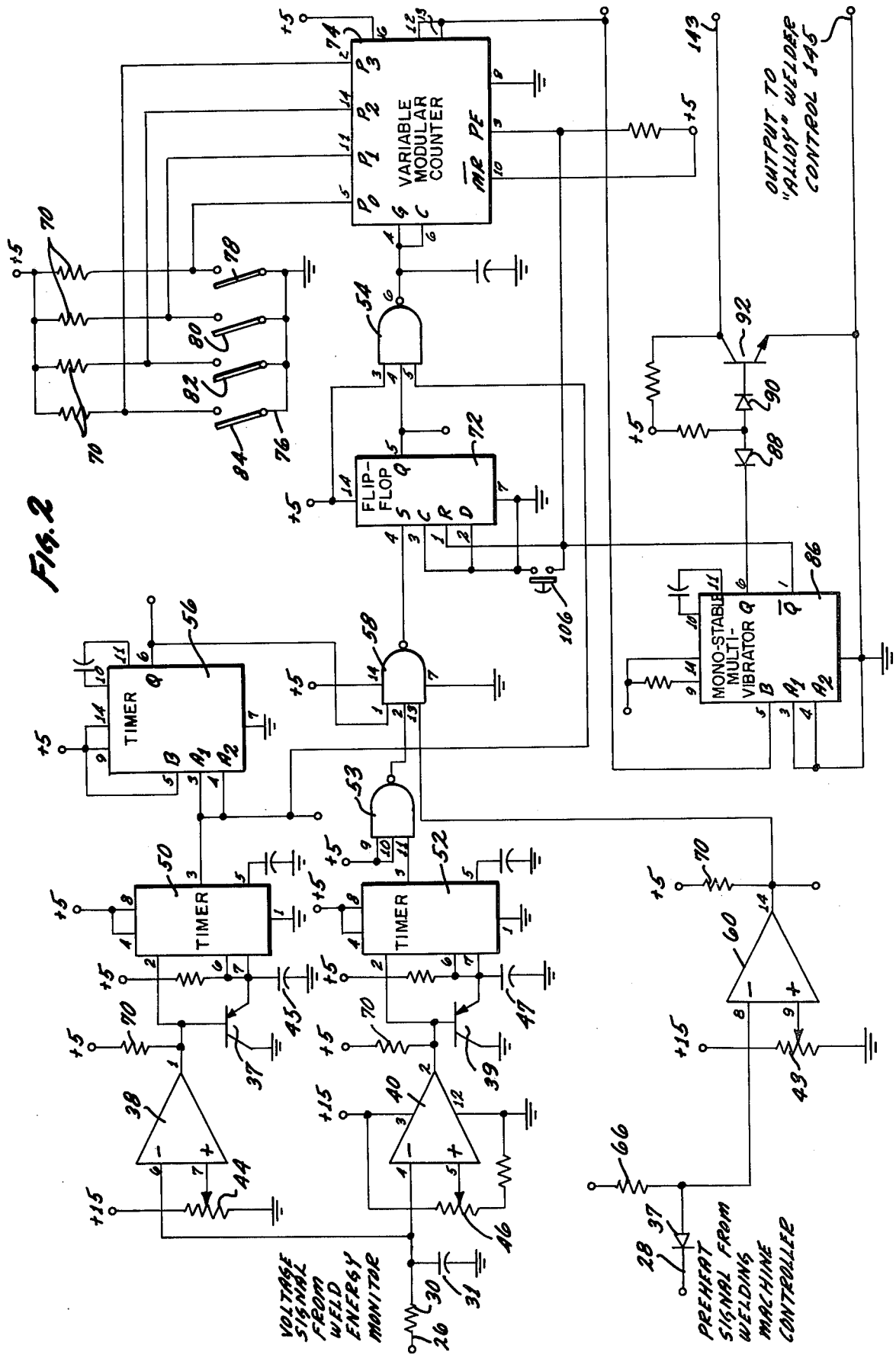
FIG. 2 is a detailed schematic showing of the voltage control of FIG. 1.

FIG. 2 is a schematic showing of the weld current controller portion of the automatic weld through adhesive controls 20 of FIG. 1. The small numerals on the various electronic components used throughout the description of the controls 20 are manufacture's designators for the various connections of the specific elements of the components of the preferred embodiment. Various other manufacture's components having similar characteristics may be used to practice the invention. Other manufacture's components, it should be understood, may have identical element connections using different designator numbers.

Input 26 is supplied from the Weld Energy Monitor and Power supply 21 and consists of a voltage level representative of the voltage level across the electrodes 16, 18 during electrode current flow. The voltage level is in the range of 0–12 volts. Input 28 likewise comes from the existing Weld Energy Monitor and Power supply 21 and specifically from the perheat counter "0" output hereinafter explained. Input 28 has a binary "0" or low signal present when a preheat current impulse flows and a binary "1" or high signal between impulses.

Input 26 is fed through a low pass filter comprising a series resistor 30 of approximately 12,000 ohms and a capacitor 31 of 0.1 micro farads shunted to ground. The common point between the resistor and capacitor is connected in parallel to one input of comparators 38, 40. These comparators are of the type MC3302P manufactured by Motorola Semi-Conductor Products, or an equivalent thereto. The second input to the afore-mentioned comparators 38, 40 is supplied from a 15V DC supply through potentiometers 44, 46 respectfully. The potentiometers establish a reference voltage input to comparators 38, 40. Comparators 38, 40 have their outputs connected to the base elements of transistors 37, 39 of the type 2N2405 or equivalent for supplying drive thereto. The transistor operates to supply an input to their respective general purpose timers 50, 52 when base drive is provided, and to discharge their associated timing capacitors 45, 47 respectfully when conducting. The output of the general purpose timer 50 supplies the input signal for delay mono-stable multivibrator 56 and a first input to NAND gate 54. The outputs from the general purpose timer 52 provides one input to NAND gate 53, the other two inputs are furhished by the 5V DC supply. The multi-purpose timer 56 and NAND gate 53 provide two inputs to a three input NAND gate 58. A third comparator 60, a third section of a single unit comprising comparator 38, 40, has one input indirectly directed from input 28, and a second input from 15V DC source through the wiper of a 10,000 ohm potentiometer 43 connected at one end to ground potential. The potentiometers 43, 44 are of the same type, generally carbon or wire wound of low wattage. Potentiometer 46, in contrast, is a precison wound 10 turn high resolution resistor and includes a counter type dial indicator. The input to input 28 first passes through a diode 37 of the type 1N91407, or equivalent, to provide input isolation for comparator 60. Resistor 66 has a fixed resistance of approximately 12,000 ohms and is connected between a +5V DC source and diode 37. The output from amplifier 60 furnishes a third input to NAND gate 58. The various comparators also have their outputs connected through a fixed resistor 70 of approximately 10,000 ohms to a 5V DC potential.

The output from NAND gate 58 supplies one input to a flip-flop 72. The Q or plus output of the flip-flop 72 supplies a second input to NAND gate 54. The third input to NAND gate 54 is connected to the +5V DC potential. NAND gates 54, 58 are each one part of a dual NAND gate MC7410P manufactured by Motorola Semi-Conductor Products Division. It should be understood that conventional NAND gates having the same or similar characteristics may be utilized to perform the required functions equally as well.

The output from NAND gate 54 supplies a signal input to variable modular counter 74. The counter is a solid state device manufactured by Motorola Semi-Conductor Products Division having the model number MC4018P or an equivalent thereto. The device is well known in the art. The time count is preloaded into the device and is counted down to zero by input pulses. The switches 78, 80, 82 and 84 are representative of the internal workings of the counter device 74. Each of these switches is connected to a +5V DC source through a 10,000 ohm resistor 70 as shown.

The output signal from the variable modulator counter 74 supplies an input to delay mono-stable multivibrator 86 of the same type as hereinbefore described. The Q or high output from the last mentioned device is connected through back-to-back diodes 88, 90 of the type, 1N914 or equivalent, to the base element of transistor 92, a type 2N2222 or equivalent. The collector and emitter of this transistor supplies the voltage override control for the pre-heat time of the electrode tip current, as hereinafter discussed. The collector of transistor 92 is connected to the Welder control and the emitter is connected to ground potential.

The flip-flop 72 receives a reset signal from the variable modular counter and the $\bar{Q}$ or low output of delay mono-stable multivibrator 86. A manual reset is provided through a biased normally open press to close switch 106 connected between ground and the $\bar{Q}$ of delay mono-stable multivibrator 86.

Figure 3:
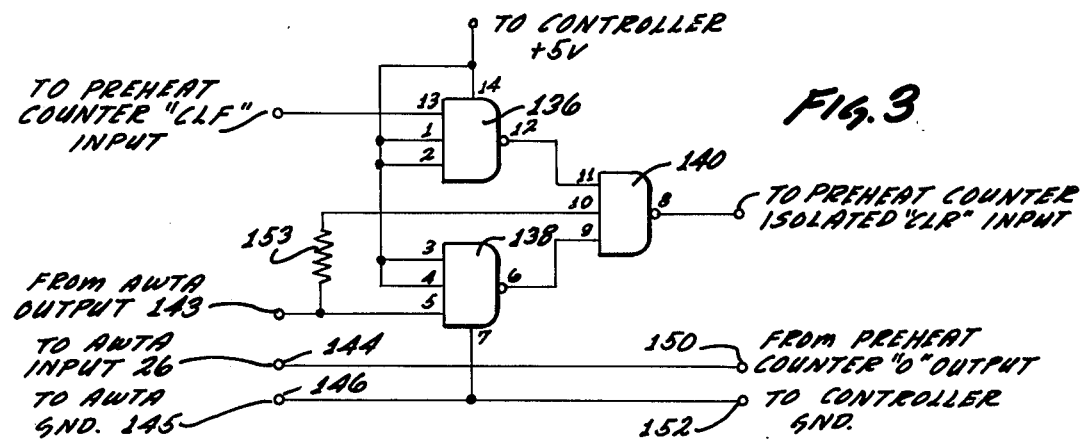
FIG. 3 shows the interface between the voltage control and machine control.

Referring now specifically to FIG. 3, a typical interface is shown for interconnecting the circuitry of the instant invention with a state of the art resistance welding apparatus. The apparatus of the preferred embodiment, for convenience, is shown as a Federal welding machine and an Alloy control model CSS 111-19. It should be understood that any commercially available welding machine and accompanying control may be used equally as well to practice the invention, keeping in mind that the improvements discussed override or control the clock of the commercial control to accomplish the improvements of the invention. The interconnections of the various other machine controls connected to the voltage controller will be readily envisioned by those skilled in the art. The typical interface shown comprises three NAND gates 136, 138 and 140. Either single NAND gates or triple NAND gates of the type MC7410P, manufactured by Motorola Semi-Conductor Products Division or an equivalent. Terminals 12, 6 and 5, through resistor 155 of approximately 10,000 ohms supplies the inputs 11, 10 and 9, respectfully of NAND gate 140. The output of NAND gate 140 is connected to the pre-heat counter isolater "ch" input of the aforementioned alloy control. It should be understood the the electronic devices of FIGS. 2 and 3 are conventional in operation and hook up. The devices are all connected in a maner as set forth in the various manufacturer's specification manuals.

Figure 4A:
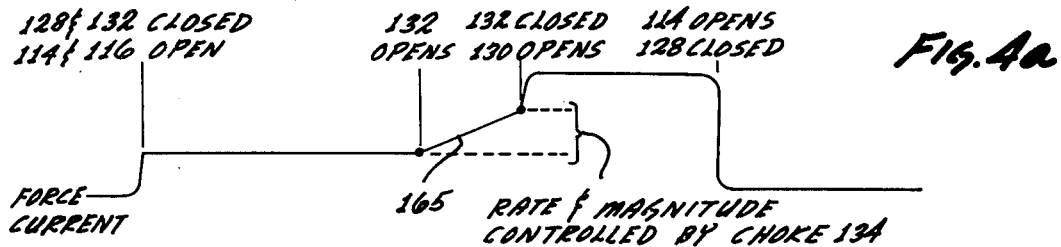
FIG. 4a is a graphic showing of the electrode pressure.
Figure 4B:
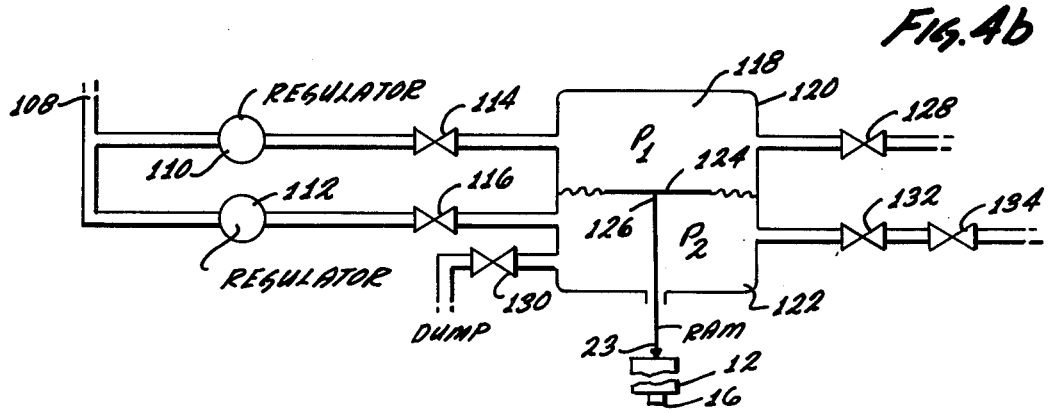
FIG. 4b is a schematic showing of the pressure controls of FIG. 1.

Referring now specifically to FIG. 4b, a diagram of pressure control 24 is shown. A source of pressurized air 108, supplied from any convenient means, having an elevated pressure of at least 80 psi supplies two similar pressure regulators 110, 112. Regulator 110 is set to allow a higher pressure output than 112 for a purpose hereinafter explained. Two similar electrically actuated controlled valves 114, 116 control the pressurized air flow from regulators 110, 112 respectively. The valves may be of any convenient type suitable to control the range of pressure supplied by the source 108. Valve 114 supplies pressurized air into chamber 118 of pressurizable cylinder 120 and valve 116 supplies pressurized air into chamber 122. Element 124, dividing the cylinder into the two aforementioned chamber may be either a diaphragm attached to the wall of the cylinder or a piston sealed to the walls and slideably engaged therewith to prevent pressure leak between the chambers. In the diaphragm type, the ram 23 is translated by the flexing of the center portion 126 of the diaphragm. In the piston type, the entire element 124 translates within the cylinder translating the ram 23. The ram 23 translates through the lower wall of chamber 122 and has a sealed relationship to prevent pressure loss from the chamber. An electrically controlled valve 128 operating as valve 114 and 166 selectively vents chamber 118 to atmosphere. A pair of similar electrically controlled valves 130, 132 vent chamber 122 when activated. A choke 134 is positioned in series with the output of the last mentioned valve. This choke has an adjustable orifice for controlling the venting of the chamber 122 through vent valve 132 as hereinafter explained.

OPERATION OF THE PREFERRED EMBODIMENT

The following discussion refers to FIGS. 3, 4a, 4b and 5A-E.

The interface circuit of FIG. 3 provides a pulse signal to the machine voltage controller to switch the voltage across the electrode tips from a lower level for melt current to a high level weld current when the voltage control and machine controller clock each have a high or "1" output.

Two pieces of conductive material 136 with a coating of thermo insulation material 138 are placed between the open electrode tips 16, 18 of welding arms 12, 14, a clamp 160, grips the two pieces of material to establish a conductive path between the electrodes.

See FIGS. 4a, 4b and 5A-E, valves 114 and 116 are opened and a level of pressurized air is admitted into chambers 118 and 122. Regulator 110 allows chamber 118 to have a pressure greater than 112 causing element 124 to displace further into chamber 122 thus applying a pressure on ram 23 and electrode arm 12. This difference of pressure is in a range of 450 to 680 pounds. It has been found that for 0.063 inch aluminum alloy 2024-T3 bare approximately 550 pounds is ideal. When this pressure differential is established, valves 114 and 116 are closed. A first level of pre-heat current is now applied by the conventional means within the welding control 22. The path of current 142 is shown by dotted lines passing from the electrodes through the shunt clamp 160. During this 142 current, see FIG. 5B, the voltage 144 is applied to the electrode tips. Referring now to 5C, at this point in time, the insulation material 138 has been penetrated by the $I^2R$ heat generated by the current flow through the shunt clamp and the squeeze pressure applied to the materials 136. When penetration occurs, the voltage across the tips drops to substantially 50% magnitude due to the increased flow of current through the materials. This voltage drop is sensed at input 26 of the automatic weld through adhesive controller 20. After a pre-set dwell 164, the automatic weld through adhesive controller 20 terminates the pre-heat current 142 and the weld current occurs.

Input 26, of the controller of FIG. 2, is connected to the detection circuit in the Machine controller which provides an output of +5V DC when pre-heat current flows and about +2V DC or less when penetration occurs. This input is a pulsating DC signal obtained, for example, by full wave rectification of the welder tip voltage. The input to 28 is a five volt logic signal which as hereinbefore stated, is low or "0" during the pre-heat sequence and high or "1" at all other times.

The voltage pulses at input 26 are fed into comparator 38, 50. The comparator 38 is set to trigger on a minimum voltage pulse which can practically exist at penetration. This level is set by potentiometer 44. Each time a pulse occurs, comparator 38 will trigger initiating general purpose timer 50. When the output of general purpose timer 50 returns to zero, approximately 20 milliseconds after the end of the last pulse, mono-stable multivibrator 56 is triggered which has a 100 microsecond output pulse. If the input level was high enough to trigger the adjustable comparator 40, this is adjusted by variable resistor 46, to trigger at approximately +2.5V DC, then the output of general purpose timer 52 will go high for 25 milliseconds after the end of the last pulse. Since the output of 52 will be high, the output of NAND gate 53 will be low when the 100 microsecond pulse arrives from 56 the NAND gate 58 will be inhibited and its output will remain high. If the input pulse at 26 is sufficient to trigger the comparator 38, but not high enough to trigger the comparator 40, then 52's output will be low and the output of NAND gate 53 will be high when the 100 microsecond pulse arrives from 56. If at the same instant the pre-heat sense comparator 60 has a high output then NAND gate 58 will go low for 100 microseconds setting flip-flop 72. This is the situation, during pre-heat, when breakthrough occurs. Once the flip-flop 72 is set, the variable module counter is enabled to count the pre-heat pulses. Following a pre-selected number of pulses, the output of mono-stable multivibrator 86 sends a signal to the weld current initiator of the control causing the voltage level to step from the pre-heat to weld.

After the beginning of the weld current cycle, electric valve 132 is activated by the time delay controlled by the start of the weld cycle. This time delay is pre-determined by the type of thickness of material being bonded and can be operator pre-set. When valve 132 is opened, the air under pressure in chamber 122 is vented through the adjustable orifice in choke 134. This orifice is manually adjustable, such as a valve would be adjusted, and is pre-set to the desired CFM flow rate for the level of tip squeeze pressure required. Valve 116 is closed when valve 132 is opened. Valve 114 remains open at this time to maintain maximum regulator 110 pressure to chamber 118. As the pressure in chamber 122 is reduced by the action of valve 132, the ram 23 increases the squeeze pressure approximately linearly upward from the 450 to 650 lbs. initial level to approximately 1900 lbs. at the termination of the weld current, see slope 165. When welding crack susceptible materials, such as aluminum, valve 130 is opened at the termination of weld current which increases squeeze pressure to approximately the 2500 lbs. squeeze force for the required length of time while the material at the location of the weld cools sufficiently to set the weld. When the forging of the materials is complete, valve 114 closes and valve 128 opens thus allowing the normally center cylinder biased element 124 to return to its original mid cylinder position. When this function is completed, valves 128, 130, 132 are closed and valves 114, 116 are opened and the material is then positioned between the tips 16, 18 for a repeat of the pre-heat and welding cycle sequence.

It should be noted that although the preferred embodiment depicts the concepts of the instant invention as applied to aluminum materials, the invention may be applied to any high electrical surface resistance materials equally as successful by varying the various pressure, current levels and sequence times.

The invention may be embodied in other specific forms without departing from the spirit or essential characteristics thereof.

The present embodiments are therefore to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for welding together a pair of conductors separated by a thermo-plastic insulation material comprising:
    a source of pressure;
    a pair of welding electrodes moveable relatively toward each other when pressure from said source is applied thereto, said electrodes having a first pre-selected level of pressure for urging said pair of conductors into electrical contact and a second pre-selected increased level of pressure for forging the portion of said pair of conductors between the electrodes;
    a power supply for supplying voltage at a first level of current through said electrodes and said pair of conductors during said first level of pressure for generating heat to soften said insulation material adjacent said electrodes and thereby effect penetration of said insulation between said electrodes and supplying voltage at a second higher level of current for welding together said pair of conductors at the location of said penetration;
    a first control means comprising a detecting means for detecting said penetration and providing a control signal responsive thereto and a timing means activated by said control signal for changing from said first level of current to said second level of current after a pre-selected time delay from said penetration; and
    a second control means for increasing the electrode pressure from said first pre-selected level to said second pre-selected increased level during at least a portion of said second higher level of current.

2. The invention as defined in claim 1, wherein said first control comprises:
    a first voltage comparator means;
    a second voltage comparator means;
    a third voltage comparator means;
    a first mono-stable device having a reset delay and receiving its input from said first voltage comparator means;
    a second mono-stable device having a reset delay and receiving its input from said second voltage comparator means;
    a third mono-stable device having a reset delay and receiving its input from said first mono-stable device;
    an inverter means for inverting the output from said second mono-stable device;
    a first NAND gate receiving inputs from said inverter, third voltage comparator means and third mono-stable device;
    a bi-stable device having a reset delay and receiving an input from said first NAND gate;
    a second NAND gate having inputs from said bi-stable device, first mono-stable device and a positive voltage source;
    a counter having an input from said second NAND gate; and
    a fourth mono-stable device having an input from said counter and providing an output signal indictive of conduction between said conductors.

3. The invention as defined in claim 2, wherein said first control further comprises a manual reset for said bi-stable device.

4. The invention as defined in claim 2, wherein said reset delay of said first, second and third mono-stable devices are 20 milliseconds, 25 milliseconds and 100 microseconds respectfully.

5. The invention as defined in claim 1, wherein said source of pressure comprises a source of pressurized air, an element positioned within a pressurizable cylinder into an upper and lower chamber, the lower chamber surface of said element having a mechanical attachment to at least one of said two electrodes, said element is vertically displaceable within said cylinder at least at the position of said mechanical attachment, said first level of electrode pressure is provided by pressurizing from said source of pressurized air, said upper chamber to a level of pressure greater than said lower chamber and the second level of electrode pressure is provided by venting said lower chamber of all pressure, and
    said second control means comprises a valve and a choke connected thereto for controlling the venting of said lower chamber.

6. The invention as defined in claim 5, wherein said choke is adjustable through an infinite range between closed and fully opened, for varying the degree of venting of said lower chamber.

7. Method of welding together a pair of conductors separated by a thermo-plastic insulation material comprising the steps of:
    applying a first pre-selected level of pressure to said pair of conductors positioned between a pair of electrodes;
    passing a first level of current through said electrodes and said pair of conductors;
    sensing electrical contact through said thermo-plastic insulation and said pair of conductors between said pair of electrodes;
    maintaining said first level of current for a pre-selected length of time after sensing said electrical contact;
    terminating said first level on current after said pre-selected length of time;
    passing a second higher level of current at the termination of first level of current through said electrodes and said pair of conductors between said electrodes; and
    increasing progressively from said first pre-selected level of pressure to a second pre-selected higher level of pre-selected pressure during at least a portion of the flow of said second higher level of current.

* * * * *